(12) United States Patent
Reineke et al.

(10) Patent No.: US 12,536,554 B2
(45) Date of Patent: Jan. 27, 2026

(54) DETERMINING PROJECTED TECHNOLOGY INFORMATION EFFECT

(71) Applicant: EMC IP Holding Company LLC, Hopkinton, MA (US)

(72) Inventors: Nicole Reineke, Northborough, MA (US); Corinne Schulze, Hopkinton, MA (US); Steve Todd, North Andover, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 18/651,373

(22) Filed: Apr. 30, 2024

(65) Prior Publication Data

US 2024/0281828 A1    Aug. 22, 2024

Related U.S. Application Data

(62) Division of application No. 17/491,015, filed on Sep. 30, 2021, now Pat. No. 12,002,062.

(51) Int. Cl.
*G06Q 30/02*    (2023.01)
*G06Q 30/0201*  (2023.01)
*G06Q 30/0204*  (2023.01)
*G06Q 30/0251*  (2023.01)

(52) U.S. Cl.
CPC ..... *G06Q 30/0201* (2013.01); *G06Q 30/0204* (2013.01); *G06Q 30/0253* (2013.01); *G06Q 30/0256* (2013.01); *G06Q 30/0269* (2013.01)

(58) Field of Classification Search
CPC .......... G06Q 30/0201; G06Q 30/0204; G06Q 30/0253; G06Q 30/0256; G06Q 30/0269
See application file for complete search history.

(56) References Cited

U.S. PATENT DOCUMENTS

| | | | |
|---|---|---|---|
| 2002/0152200 A1* | 10/2002 | Krichilsky | G06Q 30/00 |
| 2013/0332264 A1* | 12/2013 | Chittilappilly | G06Q 30/02 |
| | | | 705/14.45 |
| 2015/0127438 A1* | 5/2015 | Wedderburn | G06Q 30/0214 |
| | | | 705/14.16 |

(Continued)

OTHER PUBLICATIONS

University of Chicago "Too Many Metrics" (Year: 2016).*

(Continued)

*Primary Examiner* — Breffni Baggot
(74) *Attorney, Agent, or Firm* — Amin, Turocy & Watson, LLP

(57) ABSTRACT

A system can associate interests and responsibilities that correspond to a user account with a tag, based on search data originated by the user account. The system can determine content to send to the user account based on the tag. The system can determine that an offering is first offered after sending the content to the user account. The system can determine that the user account has purchased the offering. The system can determine that a portion of a commission associated with the user account purchasing the offering is credited to sending the content to the user account based on the tag. The system can store an indication that the portion of the commission associated with the user account purchasing the offering is credited to sending the content to the user account based on the tag.

20 Claims, 11 Drawing Sheets

(56) References Cited

U.S. PATENT DOCUMENTS

| | | | |
|---|---|---|---|
| 2015/0186924 A1* | 7/2015 | Chittilappilly | G06Q 30/0243 |
| | | | 705/14.41 |
| 2016/0210657 A1* | 7/2016 | Chittilappilly | G06Q 30/0246 |
| 2016/0210659 A1* | 7/2016 | Chittilappilly | G06Q 30/0249 |
| 2016/0210661 A1* | 7/2016 | Chittilappilly | G06Q 30/0249 |
| 2019/0050930 A1* | 2/2019 | Andrew | G06Q 30/0201 |

OTHER PUBLICATIONS

"Engineering at the limits of complexity with molecular-scale parts" MIT Media Lab. [https://www.media.mit.edu/groups/molecular-machines/overview/] retrieved Dec. 1, 2023, 3 pages.

Office Action mailed Apr. 13, 2023 for U.S. Appl. No. 17/491,015, 92 pages.

Wallace, Brian. "A Complete History of Influencer Marketing and What it Means for the Future [Infographic]", [https://socialmediaexplorer.com/content-sections/tools-and-tips/complete-history-influencer-marketing-means-future-infographic/] Sep. 5, 2017 (Year: 2017). 14 pages.

Gartner. "Hype Cycle for Data Science and Machine Learning", Gartner Hype Cycle (Year: 2019), 73 pages.

Office Action mailed Sep. 1, 2023 for U.S. Appl. No. 17/491,015, 73 pages.

Notice of Allowance mailed Feb. 2, 2024 for U.S. Appl. No. 17/491,015, 96 pages.

\* cited by examiner

900

902

DETERMINE A SECOND TAG ASSOCIATED WITH THE OFFERING 904

DETERMINE THAT THE PORTION OF THE COMMISSION ASSOCIATED WITH THE USER ACCOUNT PURCHASING THE OFFERING IS CREDITED TO SENDING THE CONTENT TO THE USER ACCOUNT BASED ON THE SECOND TAG 906

DETERMINING PROJECTED TECHNOLOGY INFORMATION EFFECT

RELATED APPLICATION

The subject patent application is a divisional of, and claims priority to, U.S. patent application Ser. No. 17/491,015, filed Sep. 30, 2021, and entitled "DETERMINING PROJECTED TECHNOLOGY INFORMATION EFFECT," the entirety of which priority application is hereby incorporated by reference herein.

BACKGROUND

Computer systems can produce content marketing for customers. Where a purchase is made, there can be a commission associated with that purchase.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can associate interests and responsibilities that correspond to a user account with a tag, based on search data originated by the user account. The system can determine content to send to the user account based on the tag. The system can determine that an offering is first offered after sending the content to the user account. The system can determine that the user account has purchased the offering. The system can determine that a portion of a commission associated with the user account purchasing the offering is credited to sending the content to the user account based on the tag. The system can store an indication that the portion of the commission associated with the user account purchasing the offering is credited to sending the content to the user account based on the tag.

An example method can comprise associating, by a system comprising a processor, interests and responsibilities that correspond to a user account with a tag. The method can further comprise determining, by the system, content to send to the user account based on the tag. The method can further comprise determining, by the system, that the user account has purchased an offering that is first offered after sending the content to the user account. The method can further comprise determining, by the system, that a portion of a commission associated with the user account purchasing the offering is credited to sending the content to the user account. The method can further comprise based on the determining that the portion of the commission is credited to sending the content to the user account, storing, by the system, an indication that the portion of the commission associated with the user account purchasing the offering is credited to sending the content to the user account.

An example non-transitory computer-readable medium can comprise instructions that, in response to execution, cause a system comprising a processor to perform operations. These operations can comprise creating a stored association between a user account and interests that correspond to the user account. These operations can further comprise, after, sending content to the user account, wherein the content is determined based on the stored association, determining that the user account has purchased an offering. These operations can further comprise, based on determining that the user account has purchased the offering, storing an indication that a portion of a commission associated with the user account purchasing the offering is credited to sending the content to the user account.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates an example process flow for identifying overlapping technologies associated with a purchase that can facilitate determining projected technology information effect, in accordance with an embodiment of this disclosure;

DETAILED DESCRIPTION

Overview

A problem can exist with accurately identifying which computer components have contributed to a long-term cycle of providing information to a customer account, where a customer account later makes a purchase based on that information. A solution to this problem can be implemented with a determining projected technology information effect computer component that can proactively and automatically identify overlaps between a technology area of initial information provided and a technology area of a later purchase.

A benefit of applying the present techniques can be to more accurately identify what components of a system contribute to a resulting purchase, so that the system can be architected to emphasize these components, and correspondingly de-emphasize components that do not contribute, thereby increasing overall efficiency.

Figure 3:
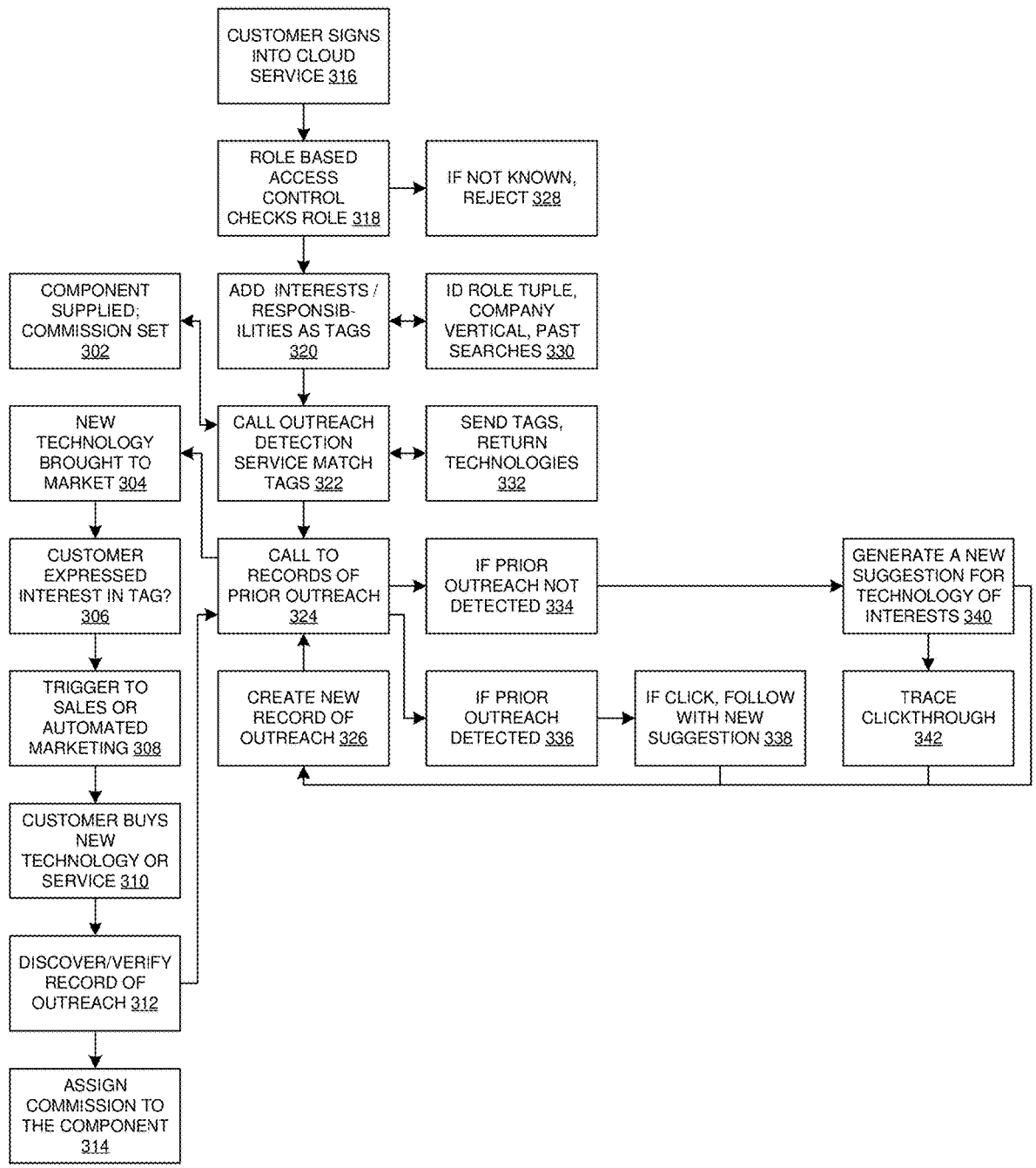
FIG. 3 illustrates another example system architecture that can facilitate determining projected technology information effect, in accordance with an embodiment of this disclosure.

The present techniques can generally be implemented on computer systems, such as the example system architecture 300 of FIG. 3. It can be that the present techniques cannot properly be implemented manually by humans because the amount of data processing and synthesizing to project technological trends can be too great to be performed manually (even where many people are involved, it can be that this does not cure the deficiencies of a manual approach, because no one person would have all of the information synthesized in a similar manner to how one computer component can have all of this information synthesized).

New approaches to technology projection can facilitate proactive outreach for thought leadership information. According to the present techniques, a forward-looking outreach component can be linked to technology sales, resulting in a traceable commission for data science objects.

Purchasing decisions can be influenced by consumption of thought leadership months and even years before a sale is made. As such, forward looking identification of interest and supplying of thought leadership content can be an important first stage of a sales cycle.

Prior techniques for thought leadership have involved by marketing and sales teams, where communication of thought leadership is done through marketing platforms based on sales flow processes where known "thought leadership" is sent out per a marketing plan. These platforms can require manual setup and identification of marketing opportunities.

Additionally, prior thought leadership outreach can fail to consider emerging technology detection approaches, which can uniquely identify technology advancements and timelines.

The present techniques can be applied to create and trace outreach opportunities through product platforms, and then allocate proper commission back to a component of earliest effective technology interest detection.

These techniques can facilitate data science approaches that detect early technology outreach opportunities to be traceable, and receive commission in recognition of thought leadership opportunity discovery.

According to the present techniques, a component can request and be assigned commission for automating detection of interests and market forward-looking technologies long (e.g., years) before they are available for purchase.

By rewarding the prediction of organizational interests far sooner than could be detected by existing approaches, there can be new market opportunities for components and data science teams that take into account vendor knowledge of Customer Organizational behaviors, emerging predictive trend detection technology, data/data set access metadata, and past responses, and then utilize the data to form new enterprise-level connections and conversations.

The present techniques can involve multiple components. A predictive trend detection component can generate a predictive list of emerging technologies, a timeframe of adoption, a scoring of a likelihood of adoption, and a series of category: keywords overlays using ingested data, such as research papers, and referential prediction.

A text processing and graph overlay component can identify near-correlation and stepped correlation of phrases and textual content. Clustering techniques and similarity metrics can be determined from graph structures created by the text processing and graph overlay component. Random walks on a graph structure can be applied to provide information about which vertices are related. In some examples, stochastic approaches can be utilized to sample an underlying distribution instead of explicitly computing it. In other examples, an explicit computation can be made.

A data and data set metadata discovery and labelling component can discover and label data and data sets with content, keywords, and inferred data, and store this data in a metadata control plane or other marketplace or data catalog.

A data search tracing component can capture information that is utilized to discover information. This technique can intercept user interaction data at an application programming interface (API) level, and generate text content for use in future suggestion components.

A problem can be that "identifying need" is not the first step before a customer engages in solution selection, or vender outreach.

It can be that a first stage of a buying cycle happens in a stage that is "complete chaos," where people are unaware that they even have a problem and are frequently unaware of emerging technology or solutions.

Once a customer has established that they have a problem, it can be too late to engage in shifting their awareness of emerging technologies to be considered in a buying cycle.

In view of this, the present techniques can be applied before a buying cycle with meaningful emerging thought leadership. This learning can happen months or years prior to any actual purchases.

An additional problem can be that current information technology (IT) infrastructure solutions do not enable connections between components that predict and tell companies about new technology evangelism opportunities and a commission for an eventual sale of that technology.

By facilitating linking commission to data science practices of efficiently identifying thought leadership opportunities and tying it to sales can encourage an economy for creating components of this nature.

Using projected technology component tracing, a record of outreach, and interaction tracing can facilitate issuing a commission to a component based on thought leadership opportunity discovery, and generation of a record of outreach in sales of an IT environment.

This approach can tie back a sale to an initial outreach of thought leadership interest by a component.

In an example, technology-related features can be forecast using information such as a number of relevant patents and papers, and a z-score (which can measure a distance of a value from a mean value of a group of values).

Using the present technologies, an emergence of a specific form of processor that is useful in large video data sets can be predicted. In an example, let Customer A be a customer tagged with video as a known interest.

In this example, a projected technology component can trigger an overlap between this new processor upcoming technology with Customer A as 70% likely to be interesting.

A vendor can trigger thought leadership outreach (such as an email) to Customer A regarding this processor.

Customer A can click through the content, or feedback can be requested. A record of outreach can be updated with a clickthrough event.

As time goes by, a new product can be brought to market that utilizes the new processor, or a near-term match. The vender can generate a new offering, where the new processor is associated with the new offer. Customer A can be known to have shown interest in the new processor, and can be extended a product offer. Where a sale is made, a commission can be allocated to the projected technology component.

As in this example, the present techniques can be implemented to connect proactive insight into emerging technologies for customers, partners, or vendors to long-term sales.

Example Architectures

Figure 1:
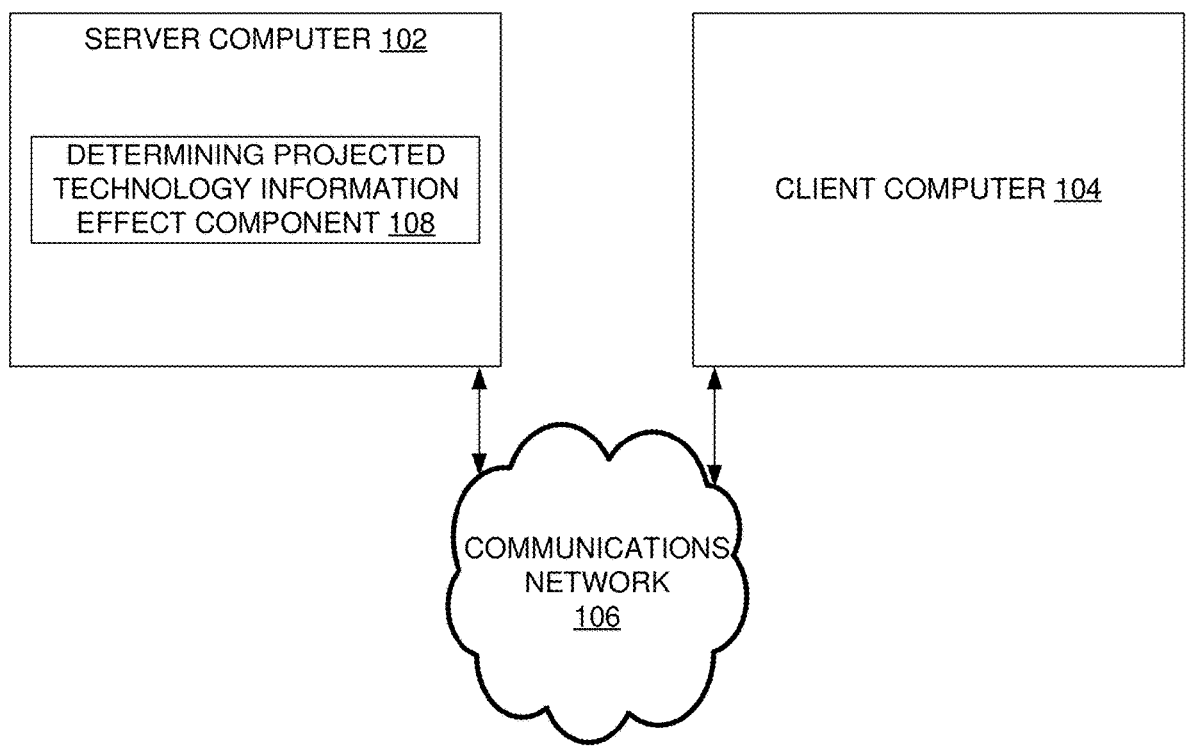
FIG. 1 illustrates an example system architecture that can facilitate determining projected technology information effect, in accordance with an embodiment of this disclosure.

FIG. 1 illustrates an example system architecture 100 that can facilitate determining projected technology information effect, in accordance with an embodiment of this disclosure. As depicted, system architecture 100 comprises server computer 102, customer computer 104, and communications network 106. In turn, server computer 102 comprises determining projected technology information effect component 108.

Figure 11:
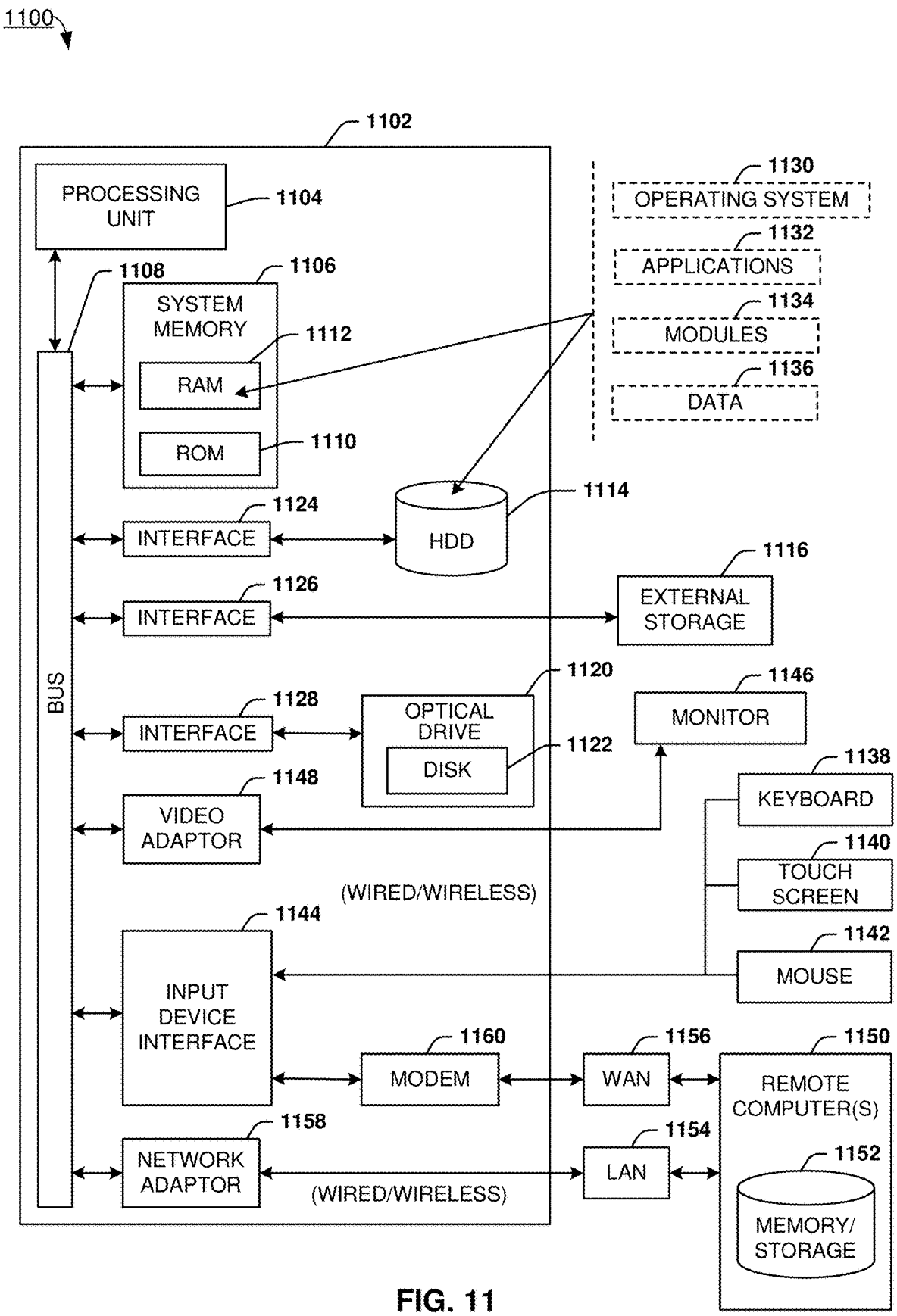
FIG. 11 illustrates an example block diagram of a computer operable to execute an embodiment of this disclosure.

Each of server computer 102 and customer computer 104 can be implemented with one or more instances of computer 1102 of FIG. 11. Communications network 106 can comprise a computer communications network, such as the INTERNET.

Server computer 102 and customer computer 104 can communicate via communications network 114. Server computer 102 can provide content on technology (that is generated by determining projected technology information effect component 108) to customer computer 104, and customer computer 104 can place orders for products with server computer 102.

In facilitating determining projected technology information effect, determining projected technology information effect component 108 can implement part(s) of the process flows of FIGS. 4-10.

Figure 2:
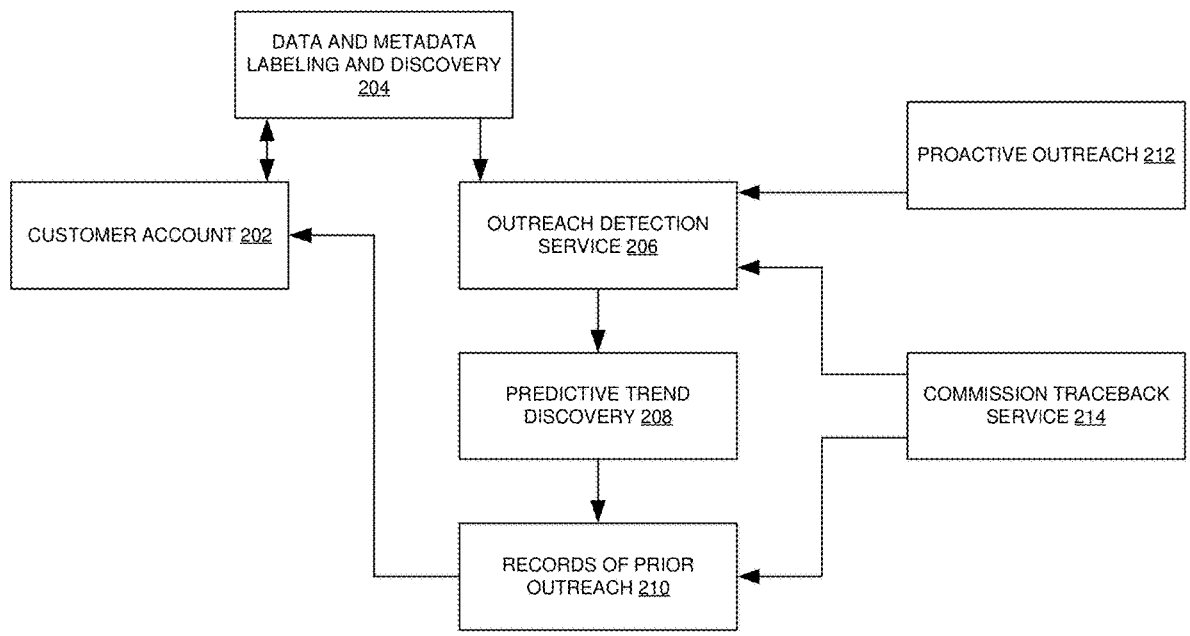
FIG. 2 illustrates another example system architecture that can facilitate determining projected technology information effect, in accordance with an embodiment of this disclosure.

FIG. 2 illustrates another example system architecture 200 that can facilitate determining projected technology information effect, in accordance with an embodiment of this disclosure. In some examples, part(s) of system architecture 200 can be implemented with instances of computing environment 1100 of FIG. 11.

System architecture 200 comprises customer account 202, data and metadata labeling and discovery 204, outreach detection service 206, predictive trend discovery 208, records of prior outreach 210, proactive outreach 212, and commission traceback service 214.

The present techniques can facilitate thought leadership opportunity identification components to be traced and assigned commission from a future sale in a complex IT environment.

Outreach detection service 206 can connect customer metadata and role information with secondary sources for predictive trend discovery. Outreach detection service 206 can trace use of a projected technology component in opportunity detection using an audit log.

Records of prior outreach 210 can comprise a set of tables that include audit of triggered projected technology component trigger events and corresponding end user responses to outreach.

Commission traceback service 214 can be triggered by a sale, and based on the sale, determine a commission allocated to a projected technology component.

FIG. 3 illustrates another example system architecture 300 that can facilitate determining projected technology information effect, in accordance with an embodiment of this disclosure. In some examples, part(s) of system architecture 200 can be implemented with instances of computing environment 1100 of FIG. 11.

System architecture 300 comprises component supplied to outreach detection service, commission expectation set 302, new technology brought to market 304, query if customer expressed interest in related tag by outreach detection service 306, trigger to sales or automated marketing 308, customer buys new technology or service 310, discover/verify record of outreach 312, assign commission to the component that discovered the technology overlap 314, customer signs into cloud service 316, role based access control checks for user role 318, generate list of known interests and responsibilities and add as tags or metadata on search context 320, call to outreach detection service match to tags 322, call to records of prior outreach 324, create new record of outreach 326, if not known, reject 328, identify role type, identify company vertical, identify past searches 330, send list of discovered tags to data office trend machine, return overlapping technologies 332, if prior outreach not detected 334, if prior outreach detected 336, if clickthrough, trigger indicator to follow up with new suggestion or follow-on suggestion 338, generate a new automated suggestion for technology of interests 340, and trace clickthrough 342.

As depicted in system architecture 300, component supplied to outreach detection service, commission expectation set 302 can be supplied to an outreach detection service. Within an outreach detection service, a supplier and any commission expectations for utilizing the projected technology component can be stored.

When a customer accesses a vender interface (e.g., via a user interface (UI) or application programming interface (API), such as at customer signs into cloud service 316), or when requested by a vendor, the outreach detection service can be triggered to review a metadata list of known interests and responsibilities related to a user and account (e.g., via a metadata tag query, such as at generate list of known interests and responsibilities and add as tags or metadata on search context 320). The outreach detection service can then utilize one or more components (such as a projected technology component) to determine whether discovered trend tags match a user and account interest and responsibilities tags (such as by call to outreach detection service match to tags 322). A list of overlapping technologies can be returned by the outreach detection service.

The outreach detection service can query a record of prior outreach (such as by call to records of prior outreach 324). If a specific technology trend outreach has not been previously suggested, a new outreach trigger can be activated (such as by generating a new automated suggestion for technology of interests 340). A trigger creation and interaction tracing (e.g., click tracking) can be stored in a record of prior outreach audit table.

Where a specific technology trend outreach is determined to have occurred, and there is a change in a timeline or other aspect of the technology recommendation or user metadata tags, a trigger can be generated to a requested sales team or outreach team of choice for a follow-up (such as by trigger to sales or automated marketing 308). A record of outreach can be generated.

In the future, when a new product or technology is available that was previously a technology detected by a projected technology component (such as at new technology brought to market 304), outreach detection service can be updated with a "tag match" between the new product or offering and the detected technology.

When a product or service is acquired by a customer (such as at customer buys new technology or service 310), there can be a call to the records of outreach (such as at discover/verify record of outreach 312). If an outreach is determined to have occurred, with traced interaction for the product, which can be determined by a product: technology tag match query, commission can be allocated to a projected technology component (such as at assign commission to the component that discovered the technology overlap 314). An amount of commission can have been specified during an initial component contribution (such as at component supplied to outreach detection service, commission expectation set 302), or can be set by agreement.

Example Process Flows

Figure 4:
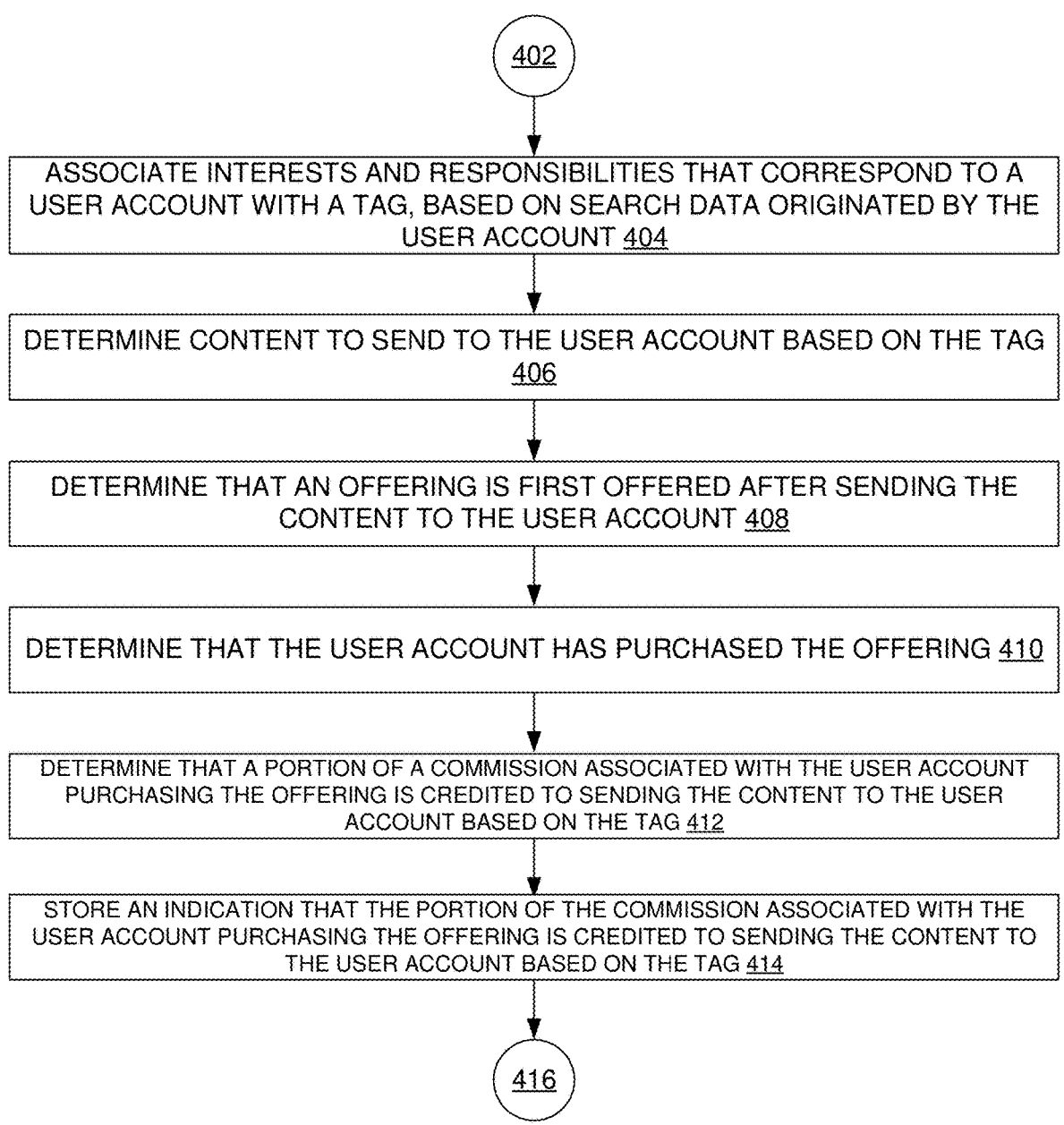
FIG. 4 illustrates an example process flow that can facilitate determining projected technology information effect, in accordance with an embodiment of this disclosure.

FIG. 4 illustrates an example process flow 400 that can facilitate determining projected technology information effect, in accordance with an embodiment of this disclosure. In some examples, one or more embodiments of process flow 400 can be implemented by determining projected technology information effect component 108 of FIG. 1, system architecture 200 of FIG. 2, system architecture 300 of FIG. 3, and/or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404. Operation 404 depicts associating interests and responsibilities that correspond to a user account with a tag, based on search data originated by the user account. In some examples, this can be implemented by generating a list of known interests and responsibilities and adding as tags or metadata on search context 320 of FIG. 3.

In some examples, the tag is determined based on an organizational role associated with the user account, a market segment associated with the user account, or prior searches associated with the user account. This can be implemented by identifying role tuple, identify company vertical, identify past searches 330 of FIG. 3.

After operation 404, process flow 400 moves to operation 406.

Operation 406 depicts determining content to send to the user account based on the tag. In some examples, this can be implemented by calling to outreach detection service match to tags 322 of FIG. 3.

After operation 406, process flow 400 moves to operation 408.

Operation 408 depicts determining that an offering is first offered after sending the content to the user account. In some examples, this can be implemented by new technology brought to market 304 of FIG. 3.

In some examples, a computer component performs the sending of the content to the user account, and wherein the computer component identifies the portion of the commission that is associated with utilizing the computer component. That is, determining projected technology information effect component 108 of FIG. 1 can provide information to an outreach detection service, and can state what amount of a commission is attributed to determining projected technology information effect component 108 if used.

After operation 408, process flow 400 moves to operation 410.

Operation 410 depicts determining that the user account has purchased the offering. In some examples, this can be implemented by customer buys new technology or service 310 of FIG. 3.

After operation 410, process flow 400 moves to operation 412.

Operation 412 depicts determining that a portion of a commission associated with the user account purchasing the offering is credited to sending the content to the user account based on the tag. In some examples, this can be implemented by component supplied to outreach detection service; commission expectation set 302 of FIG. 3.

After operation 412, process flow 400 moves to operation 414.

Operation 414 storing an indication that the portion of the commission associated with the user account purchasing the offering is credited to sending the content to the user account based on the tag. In some examples, this can be implemented by assigning commission to the component that discovered the technology overlap 314 of FIG. 3.

After operation 414, process flow 400 moves to 416, where process flow 400 ends.

Figure 5:
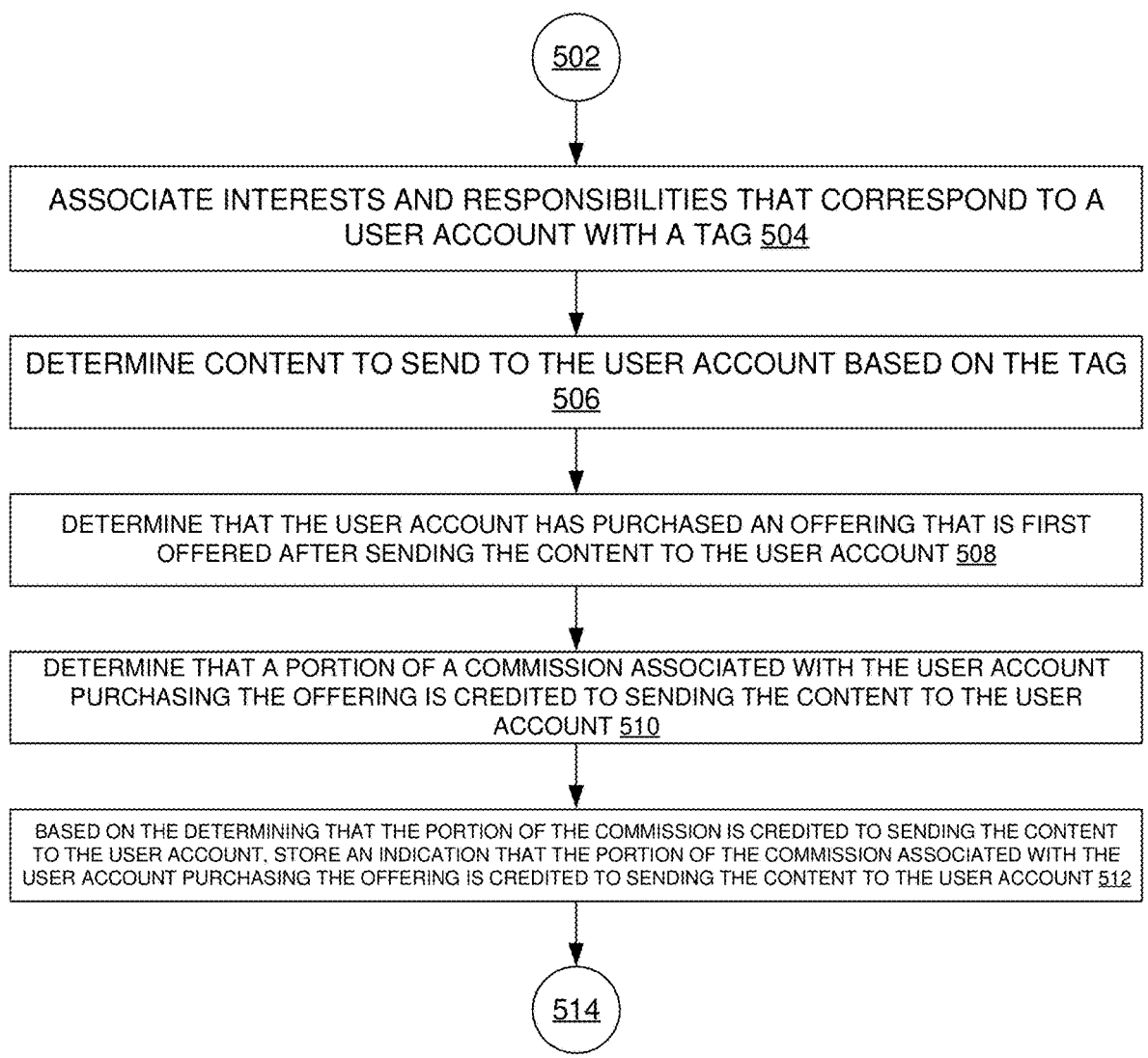
FIG. 5 illustrates another example process flow that can facilitate determining projected technology information effect, in accordance with an embodiment of this disclosure.

FIG. 5 illustrates another example process flow 500 that can facilitate determining projected technology information effect, in accordance with an embodiment of this disclosure. In some examples, one or more embodiments of process flow 500 can be implemented by determining projected technology information effect component 108 of FIG. 1, system architecture 200 of FIG. 2, system architecture 300 of FIG. 3, and/or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504. Operation 504 depicts associating interests and responsibilities that correspond to a user account with a tag. In some examples, operation 504 can be implemented in a similar manner as operation 404 of FIG. 4.

After operation 504, process flow 500 moves to operation 506.

Operation 506 depicts determining content to send to the user account based on the tag. In some examples, operation 506 can be implemented in a similar manner as operation 406 of FIG. 4.

After operation 506, process flow 500 moves to operation 508.

Operation 508 depicts determining that the user account has purchased an offering that is first offered after sending the content to the user account. In some examples, operation 508 can be implemented in a similar manner as operations 408-410 of FIG. 4.

In some examples, operation 508 comprises, in response to determining that the offering is first offered, determining whether the user account has accessed the content. In some examples, this can be implemented by calling to records of prior outreach 324 of FIG. 3.

In some examples, the content is first content. In such examples, operation 508 can comprise, in response to determining that the user account has accessed the content, sending the user account second content that comprises new content relative to the first content or follow-on content relative to the first content. This can be implemented by if prior outreach detected 336 of FIG. 3.

Additionally, in such examples operation 508 can comprise, in response to determining that the user account has not accessed the content, determining second content based on the tag, sending the second content to the user account. This can be implemented if prior outreach is not detected 334 of FIG. 3. In some examples, this can comprise determining whether the user account accesses the second content, and this can be implemented by generating a new automated suggestion for technology of interests 340 of FIG. 3.

In some examples, this can also comprise storing records of outreach, the records of outreach comprising a first record of sending the first content to the user account, a second record of sending the second content to the user account, a third record of whether the user account accessed the first content, and a fourth record of whether the user account accessed the second content. This can be implemented by trace clickthrough 342 of FIG. 3.

After operation 508, process flow 500 moves to operation 510.

Operation 510 depicts determining that a portion of a commission associated with the user account purchasing the offering is credited to sending the content to the user account. In some examples, operation 510 can be implemented in a similar manner as operation 412 of FIG. 4.

In some examples, operation 510 comprises determining that the content was sent to the user account. In some examples, this can be implemented by discover/verify record of outreach 312 of FIG. 3.

After operation 510, process flow 500 moves to operation 512.

Operation 512 depicts, based on the determining that the portion of the commission is credited to sending the content to the user account, storing an indication that the portion of the commission associated with the user account purchasing the offering is credited to sending the content to the user account. In some examples, operation 512 can be implemented in a similar manner as operation 414 of FIG. 4.

After operation 512, process flow 500 moves to 514, where process flow 500 ends.

Figure 6:
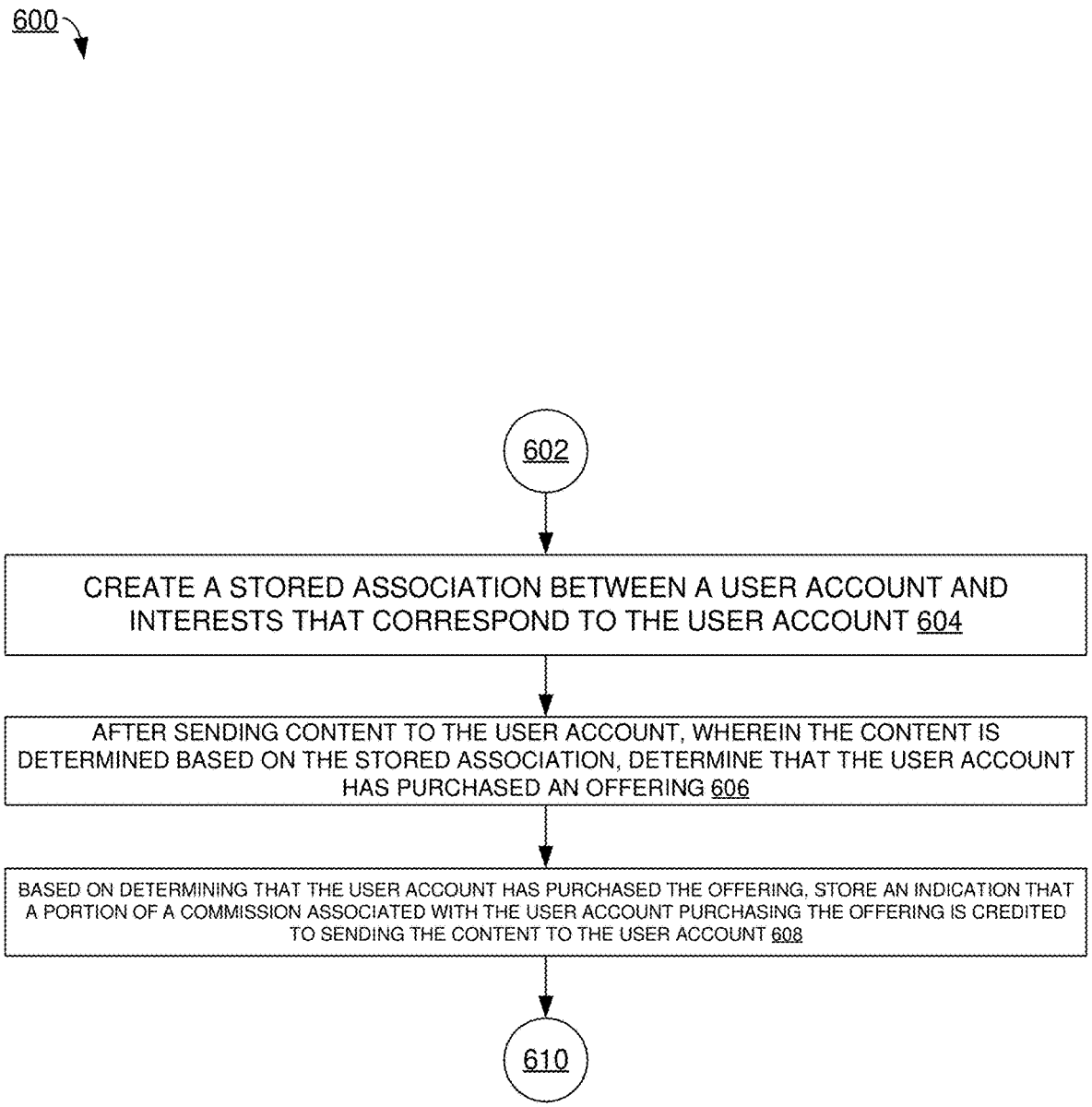
FIG. 6 illustrates another example process flow that can facilitate determining projected technology information effect, in accordance with an embodiment of this disclosure.

FIG. 6 illustrates another example process flow 600 that can facilitate determining projected technology information effect, in accordance with an embodiment of this disclosure. In some examples, one or more embodiments of process flow 600 can be implemented by determining projected technology information effect component 108 of FIG. 1, system architecture 200 of FIG. 2, system architecture 300 of FIG. 3, and/or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604. Operation 604 depicts creating a stored association between a user account and interests that correspond to the user account. In some examples, operation 604 can be implemented in a similar manner as operation 404 of FIG. 4.

After operation 604, process flow 600 moves to operation 606.

Operation 606 depicts, after sending content to the user account, wherein the content is determined based on the stored association, determining that the user account has purchased an offering. In some examples, operation 606 can be implemented in a similar manner as operations 406-410 of FIG. 4.

In some examples, the offering is initially offered subsequent to sending the content to the user account. That is, thought leadership can be provided, and later, new technology can be brought to market.

In some examples, operation 606 comprises, in response to determining that the user account has purchased the offering, determining that the portion of the commission associated with the user account purchasing the offering is credited to sending the content to the user account based on determining that the user account expressed interest in the content. That is, after a customer purchases a product, then it can be determined that the customer earlier expressed interest in the thought leadership.

In some examples, a component that determines the content based on the stored association identifies an amount of the portion of the commission associated with using the content. For example, determining projected technology information effect component 108 of FIG. 1 can assist in outreach detection, and specify a commission expectation for doing so.

In some examples, the content is associated with a first technology area, wherein the offering is associated with a second technology area, wherein the first technology area and the second technology area differ, and wherein there is an overlap between the first technology area and the second technology area. That is, there can be an overlap between a thought leadership area and a new technology area, where the two areas are not identical.

In some examples, a component that determines the content based on the stored association identifies the overlap between the first technology area and the second technology area. That is, determining projected technology information effect component 108 of FIG. 1 can determine that there is an overlap between the technology areas.

After operation 606, process flow 600 moves to operation 608.

Operation 608 depicts, based on determining that the user account has purchased the offering, storing an indication that a portion of a commission associated with the user account purchasing the offering is credited to sending the content to the user account. In some examples, operation 608 can be implemented in a similar manner as operations 412-414 of FIG. 4.

After operation 608, process flow 600 moves to 610, where process flow 600 ends.

Figure 7:
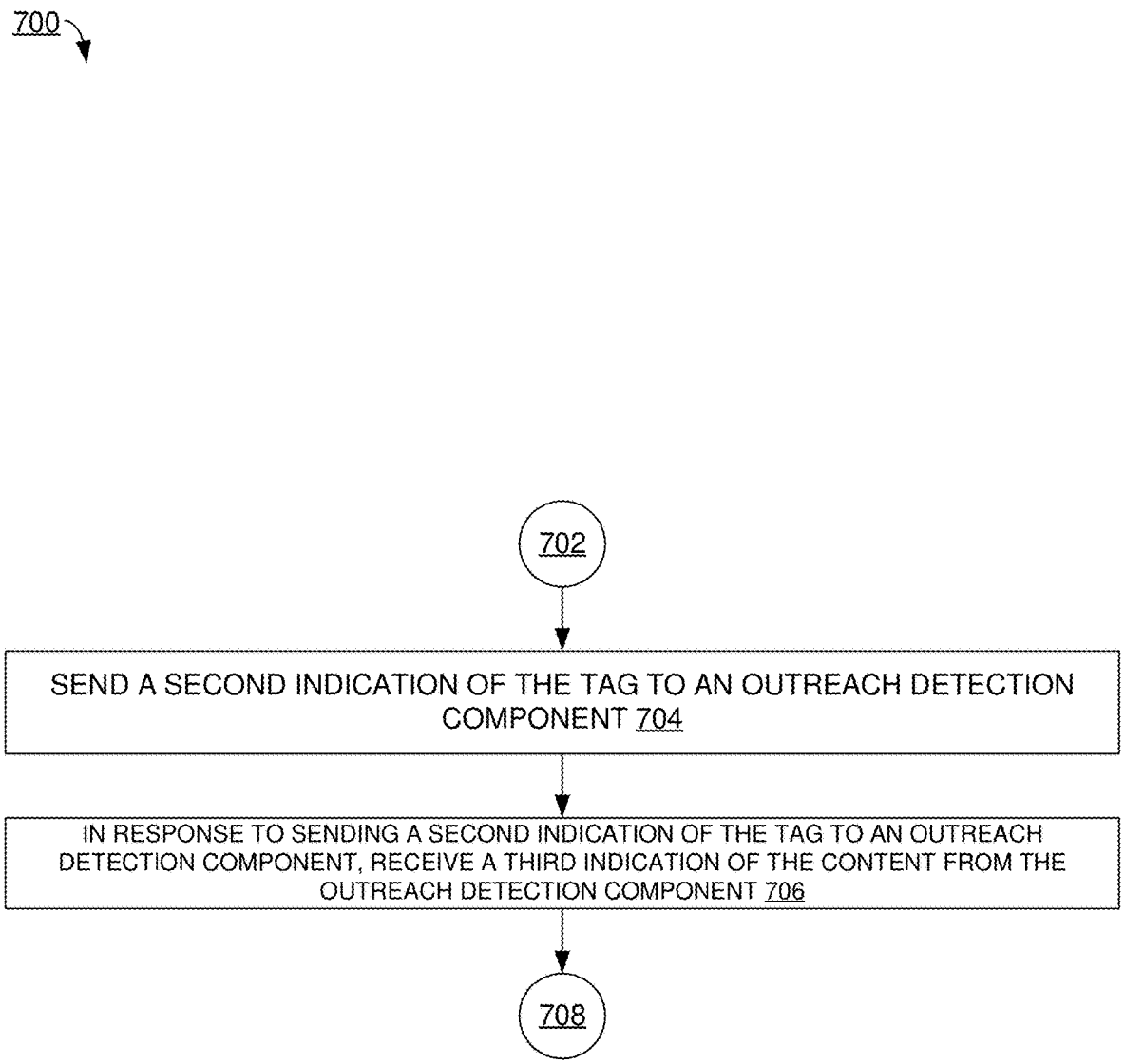
FIG. 7 illustrates an example process flow for making a call to an outreach detection service match to tags that can facilitate determining projected technology information effect, in accordance with an embodiment of this disclosure.

FIG. 7 illustrates an example process flow 700 for making a call to an outreach detection service match to tags that can facilitate determining projected technology information effect, in accordance with an embodiment of this disclosure. In some examples, one or more embodiments of process flow 700 can be implemented by determining projected technology information effect component 108 of FIG. 1, system architecture 200 of FIG. 2, system architecture 300 of FIG. 3, and/or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704. In some examples, the indication of process flow 400 is a first indication. In such examples, operation 704 depicts sending a second indication of the tag to an outreach detection component. In some examples, this can be implemented by calling to outreach detection service match to tags 322 of FIG. 3. After operation 704, process flow 700 moves to operation 706.

Operation 706 depicts, in response to sending a second indication of the tag to an outreach detection component, receiving a third indication of the content from the outreach detection component. In some examples, this can be implemented by calling to outreach detection service match to tags 322 of FIG. 3. After operation 706, process flow 700 moves to 708, where process flow 700 ends.

Figure 8:
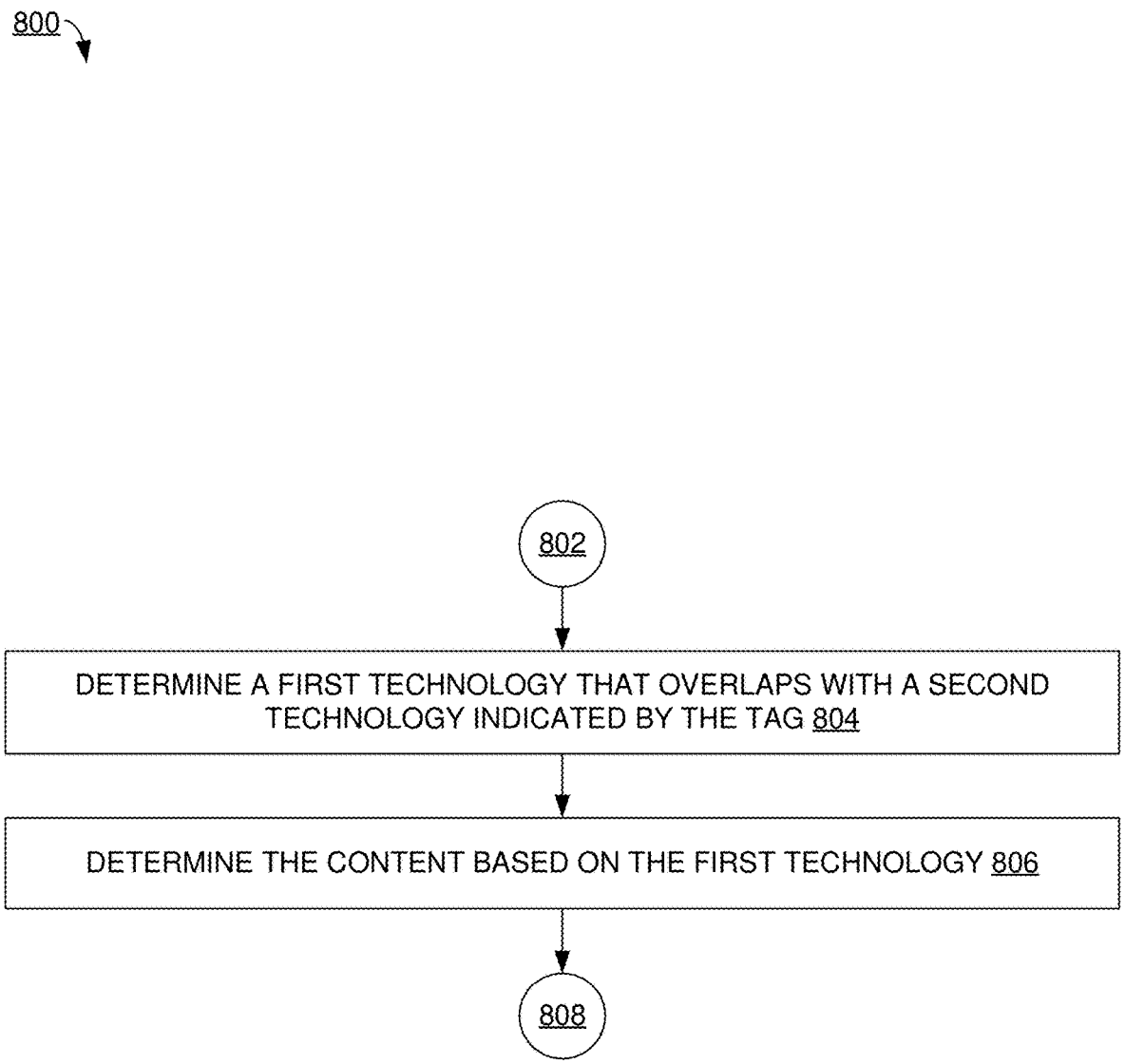
FIG. 8 illustrates an example process flow for retrieving overlapping technologies that can facilitate determining projected technology information effect, in accordance with an embodiment of this disclosure.

FIG. 8 illustrates an example process flow 800 for retrieving overlapping technologies that can facilitate determining projected technology information effect, in accordance with an embodiment of this disclosure. In some examples, one or more embodiments of process flow 800 can be implemented by determining projected technology information effect component 108 of FIG. 1, system architecture 200 of FIG. 2, system architecture 300 of FIG. 3, and/or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804. In some examples, the indication of process flow 400 is a first indication. In such examples, operation 804 depicts determining a first technology that overlaps with a second technology indicated by the tags. In some examples, this can be implemented by sending a list of discovered tags to data office trend machine, return overlapping technologies 332 of FIG. 3. After operation 804, process flow 800 moves to operation 806.

Operation 806 depicts determining the content based on the first technology. In some examples, this can be implemented by sending a list of discovered tags to data office trend machine, return overlapping technologies 332 of FIG. 3. After operation 806, process flow 800 moves to 808, where process flow 800 ends.

FIG. 9 illustrates an example process flow 900 for identifying overlapping technologies associated with a purchase that can facilitate determining projected technology information effect, in accordance with an embodiment of this disclosure. In some examples, one or more embodiments of process flow 900 can be implemented by determining projected technology information effect component 108 of FIG. 1, system architecture 200 of FIG. 2, system architecture 300 of FIG. 3, and/or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904. In some examples, the tag of process flow 400 is a first tag. In such examples, operation 904 depicts determining a second tag associated with the offering. In some examples, this can be implemented by query if customer expressed interest in related tag by outreach detection service 306 of FIG. 3. After operation 904, process flow 900 moves to operation 906.

Operation 906 depicts determining that the portion of the commission associated with the user account purchasing the offering is credited to sending the content to the user account based on the second tag. In some examples, this can be implemented by assigning commission to the component that discovered the technology overlap 314 of FIG. 3. After operation 906, process flow 900 moves to 908, where process flow 900 ends.

Figure 10:
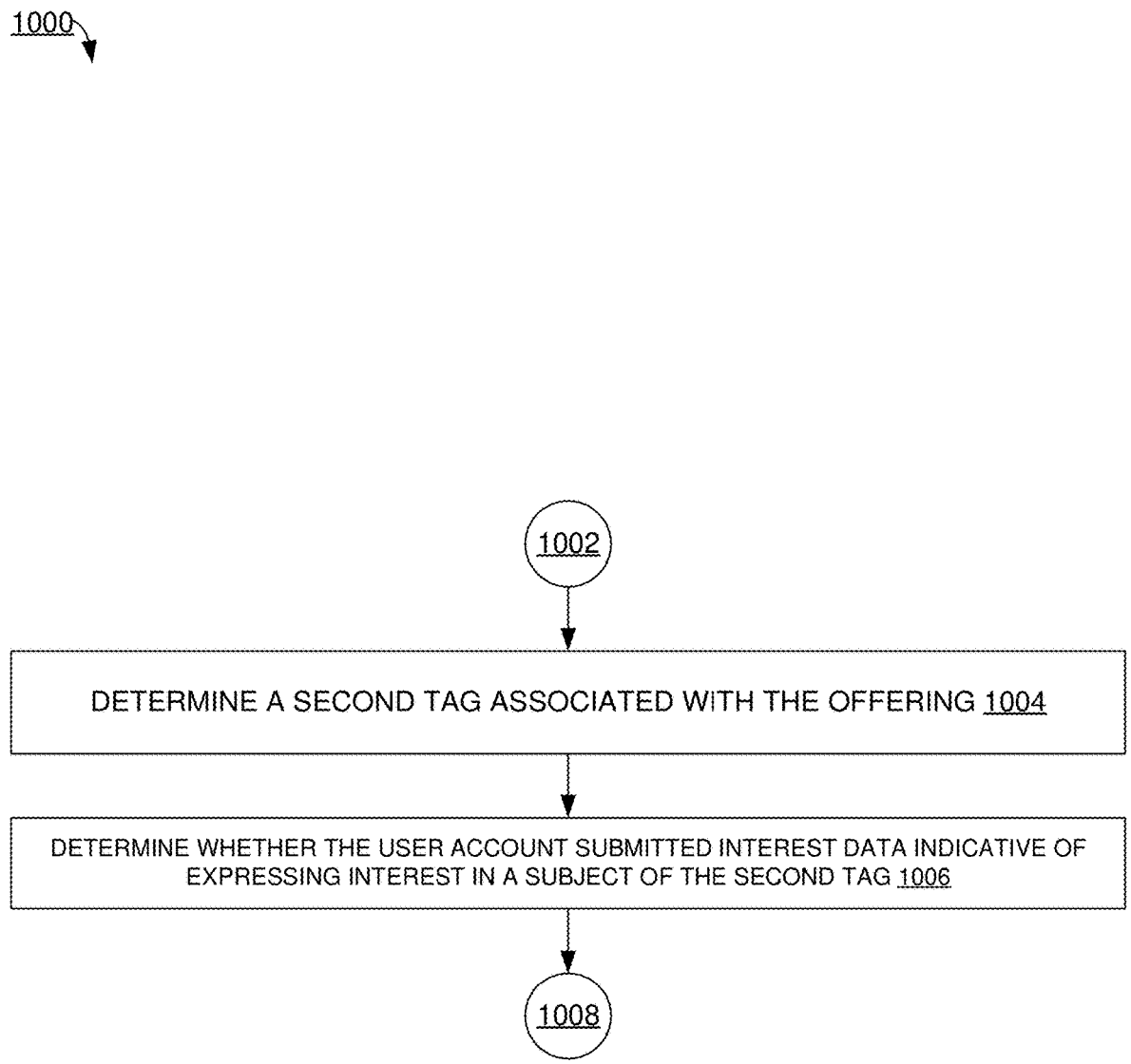
FIG. 10 illustrates an example process flow for determining whether a customer has expressed interest in a related tag that can facilitate determining projected technology information effect, in accordance with an embodiment of this disclosure.

FIG. 10 illustrates an example process flow 1000 for determining whether a customer has expressed interest in a related tag that can facilitate determining projected technology information effect, in accordance with an embodiment of this disclosure. In some examples, one or more embodiments of process flow 1000 can be implemented by determining projected technology information effect component 108 of FIG. 1, system architecture 200 of FIG. 2, system architecture 300 of FIG. 3, and/or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004. In some examples, the tag of process flow 400 is a first tag. In such examples, operation 1004 depicts determining a second tag associated with the offering. In some examples, this can be implemented by query if customer expressed interest in related tag by outreach detection service 306 of FIG. 3. After operation 1004, process flow 1000 moves to operation 1006.

Operation 1006 depicts determining whether the user account submitted interest data indicative of expressing interest in a subject of the second tag. In some examples, this can be implemented by query if customer expressed interest in related tag by outreach detection service 306 of FIG. 3. After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server computer 102 or customer computer 104 of FIG. 1, part(s) of system architecture 200 of FIG. 2, and/or part(s) of system architecture 300 of FIG. 3.

In some examples, computing environment 1100 can implement one or more embodiments of the process flows of FIGS. 4-10 to facilitate computer update performance assessment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
   in response to accessing a cloud service via a user account, ascertaining interests and responsibilities that correspond to the user account based on search data originated by the user account, wherein the interests and responsibilities are associated with a first tag;
   ascertaining a technology corresponding to the first tag;
   sending content about the technology to the user account, wherein the content is determined by a computer component of computer components that are configured to send, via the user account, a group of content that comprises the content, and based on the first tag;
   determining that the user account has purchased an offering that is available at a current time, wherein the offering was first offered after sending the content to the user account;
   based on determining that the sending of the content to the user account occurred, based on performing a query that matches the offering with the first tag, based on matching the first tag with a second tag that is associated with the offering, and based on determining that the offering has been purchased via the user account, determining that a portion of a commission associated with the user account purchasing the offering is credited to sending the content to the user account based on the first tag;
   determining that, of the computer components, the computer component performed the determining of the content to send to the user account based on performing a query that matches the offering with the first tag; and
   storing an indication that the portion of the commission associated with the user account purchasing the offering is credited to the computer component.

2. The system of claim 1, wherein the computer component is a first computer component, wherein a second computer component of the group of computer components performs the sending of the content to the user account, and wherein the second computer component identifies the portion of the commission that is associated with utilizing the first computer component.

3. The system of claim 1, wherein the first tag is determined based on an organizational role associated with the user account, a market segment associated with the user account, or prior searches associated with the user account.

4. The system of claim 1, wherein the indication is a first indication, and wherein determining the content about the technology to send to the user account comprises:
   in response to sending a second indication of the first tag to an outreach detection component, receiving a third indication of the content from the outreach detection component.

5. The system of claim 1, wherein the indication is a first indication, and wherein determining the content about the technology to send to the user account comprises:
   determining a first technology that overlaps with a second technology indicated by the first tag; and
   determining the content based on the first technology.

6. The system of claim 1, wherein the operations further comprise:
   determining a third tag associated with the offering, and wherein the determining that the portion of the commission associated with the user account purchasing the offering is credited to sending the content to the user account based on the third tag.

7. The system of claim 1, wherein the operations further comprise:
   determining a third tag associated with the offering; and
   determining whether the user account submitted interest data indicative of expressing interest in a subject of the third tag.

8. A method, comprising:
   identifying, by a system comprising at least one processor, interests and responsibilities that correspond to the user account based on search data that is originated by the user account, wherein the interests and responsibilities are associated with a first tag;
   in response to a user account accessing a cloud service, ascertaining, by the system, a technology that corresponds to the first tag;
   sending, by the system, content about the technology to the user account, wherein the content is determined by a computer system based on the first tag;
   determining, by the system, that the user account has purchased an offering that is available at a current time, wherein the offering was first offered after sending the content to the user account;
   based on determining that the sending of the content to the user account occurred, based on performing a query that matches the offering with the first tag, based on matching the first tag with a second tag that is associated with the offering, and based on determining that the user account has purchased the offering, determining, by the system, that a portion of a commission associated with the user account purchasing the offering is credited to sending the content to the user account based on the first tag;
   determining that the computer system performed the determining of the content to send to the user account based on the first tag based on performing a query that matches the offering with the first tag; and
   determining, by the system, that the portion of the commission associated with the user account purchasing the offering is credited to the computer system based on the computer system having performed the determining of the content to send to the user account.

9. The method of claim 8, wherein the determining that the portion of the commission associated with the user account purchasing the offering is credited to the computer system based on the computer system having performed the determining of the content to send to the user account comprises:
   determining, by the system, that the content was sent to the user account.

10. The method of claim 8, further comprising:
    in response to determining that the offering is first offered, determining, by the system, whether the user account has accessed the content.

11. The method of claim 10, wherein the content is first content, and further comprising:
   in response to determining that the user account has accessed the content, sending, by the system to the user account, second content that comprises new content relative to the first content or follow-on content relative to the first content.

12. The method of claim 10, wherein the content is first content, and further comprising:
   in response to determining that the user account has not accessed the content, determining, by the system, second content based on the first tag; and
   sending, by the system, the second content to the user account.

13. The system of claim 12, further comprising:
   determining, by the system, whether the user account accesses the second content.

14. The system of claim 12, further comprising:
   storing, by the system, records of outreach, the records of outreach comprising a first record of sending the first content to the user account, a second record of sending the second content to the user account, a third record of whether the user account accessed the first content, and a fourth record of whether the user account accessed the second content.

15. A non-transitory computer-readable medium comprising instructions that, in response to execution, cause a system comprising at least one processor to perform operations, comprising:
   in response to accessing a cloud service in connection with a user account, ascertaining interests and responsibilities that correspond to the user account based on search data that is originated by the user account, wherein the interests and responsibilities are associated with a first tag;
   sending content about a technology to the user account, wherein the content is determined by a component based a technology that corresponds to the first tag;
   determining that an offering was purchased that is available at a current time, via the user account, wherein the offering was first offered after sending the content to the user account;
   based on determining that the sending of the content occurred, and based on determining that the offering was purchased via the user account, based on matching the first tag with a second tag that is associated with the offering, based on performing a query that matches the offering with the first tag, and further based on determining that the offering was purchased via the user account, determining that a portion of a commission, associated with the offering having been purchased via the user account, is credited to the component for sending the content to the user account based on the first tag.

16. The non-transitory computer-readable medium of claim 15, wherein the content is first content, and wherein the operations further comprise:
   emphasizing second content provided by the component to user accounts based on the determining that, of a group of components that comprises the component, the component performed the determining of the content to send to the user account.

17. The non-transitory computer-readable medium of claim 15, wherein the operations further comprise:
   in response to determining that the offering was purchased via the user account, determining that the portion of the commission associated with the offering having been purchased via the user account is credited to sending the content to the user account based on determining that interest in the content was expressed via the user account.

18. The non-transitory computer-readable medium of claim 15, wherein the component is a first component, and wherein a second component that determines the content based on an association between the technology and the content identifies an amount of the portion of the commission associated with using the content.

19. The non-transitory computer-readable medium of claim 15, wherein the content is associated with a first technology area, wherein the offering is associated with a second technology area, wherein the first technology area and the second technology area differ, and wherein there is an overlap between the first technology area and the second technology area.

20. The non-transitory computer-readable medium of claim 19, wherein the component is a first component, and wherein a second component that determines the content based on an association between the technology and the content identifies the overlap between the first technology area and the second technology area.

* * * * *